July 22, 1947.  H. D. SCRYMGEOUR  2,424,335
COWLING FOR AIRCRAFT ENGINES
Filed June 2, 1945  3 Sheets-Sheet 1

Inventor
Harper D. Scrymgeour

Inventor
Harper D. Scrymgeour

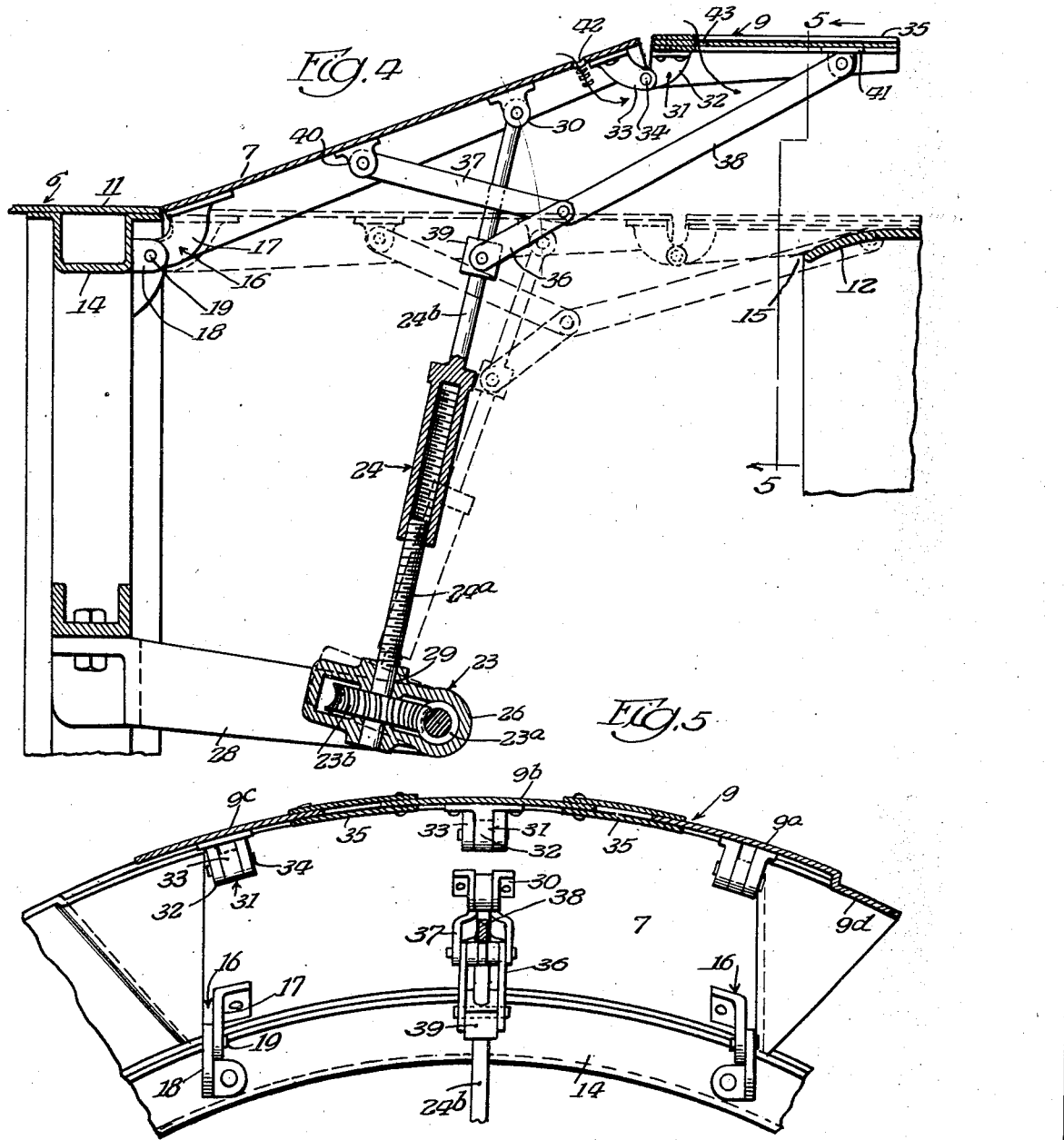

Patented July 22, 1947

2,424,335

UNITED STATES PATENT OFFICE 2,424,335

COWLING FOR AIRCRAFT ENGINES

Harper D. Scrymgeour, Coronado, Calif., assignor to Consolidated Vultee Aircraft Corporation, San Diego, Calif., a corporation of Delaware Application June 2, 1945, Serial No. 597,262

6 Claims. (Cl. 123—171)

The present invention relates generally to airplane nacelle structures. More particularly the invention relates to that type of nacelle structure which is used in connection with a tractor variety airplane, serves as an enclosing or housing medium for the propeller driving engine of the airplane and as its principal components or parts comprises: (1) a tubular shell having the front end thereof extending around the engine and provided with an axial inlet opening for engine cooling air, and embodying in the portion thereof that is rearwards or aft of the engine an annular outlet opening for the engine cooling air; (2) an annular series of cowl flaps which extend around, and serve to control the flow of air through, the outlet opening in the shell and have the front or leading edges thereof hinged in order that they are capable of being swung back and forth between a closed position wherein they extend across and serve to close the annular outlet opening and an open position wherein they extend outwards away from the outlet opening and thus expose the latter so as to permit the flow of cooling air through the front end of the shell and around the engine for engine cooling purposes; and (3) mechanism for conjointly shifting the cowl flaps back and forth between their closed and open positions.

In practice it has been found that an airplane nacelle structure of this type is objectionable because when the airplane is in operation while the cowl flaps are in their open position the engine cooling air emanating from the annular outlet opening in the shell produces in conjunction with the propeller produced slip stream such turbulence and eddy currents as to cause pronounced flutter and vibration of the various control surfaces on the airplane empennage.

One object of the invention is to provide an airplane nacelle structure which is an improvement upon, and eliminates the defections of, conventional or standard nacelle structures by reason of the fact that it comprises simple means in the form of auxiliary cowl flaps for so controlling the flow of air emanating from the annular outlet opening in the shell when the airplane is in operation and the main cowl flaps are in their open position that the tendency of such air to produce turbulence and eddy currents when it joins the propeller created slip stream is reduced to a practical minimum.

Another object of the invention is to provide an airplane nacelle structure of the last mentioned type and character in which the auxiliary cowl flaps are hinged to the rear or trailing edges of the main cowl flaps and have associated therewith linkages whereby they are maintained in substantially parallel relation with the axis of the shell regardless of the position of the main cowl flaps.

A further object of the invention is to provide an airplane nacelle structure which is generally an improvement in the art and is characterized by high efficiency so far as cooling of the propeller driving engine is concerned.

Other objects of the invention and the various advantages and characteristics of the present airplane nacelle structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a view partly in side elevation and partly in longitudinal section of an airplane nacelle structure embodying the invention;

Figure 2 in a vertical transverse section taken on the line 2—2 of Figure 1 and illustrating in detail the construction, arrangement and design of the mechanism for conjointly shifting the main cowl flaps back and forth between their closed and open positions;

Figure 4 is an enlarged vertical longitudinal section taken on the line 4—4 of Figure 2 and illustrating in detail the manner in which the linkages serve to maintain the auxiliary cowl flaps in substantially parallel relation with the axis of the shell regardless of the position of the main cowl flaps; and Figure 5 is a rear view of one of the main cowl flaps and its auxliiary cowl flap.

Figure 1:
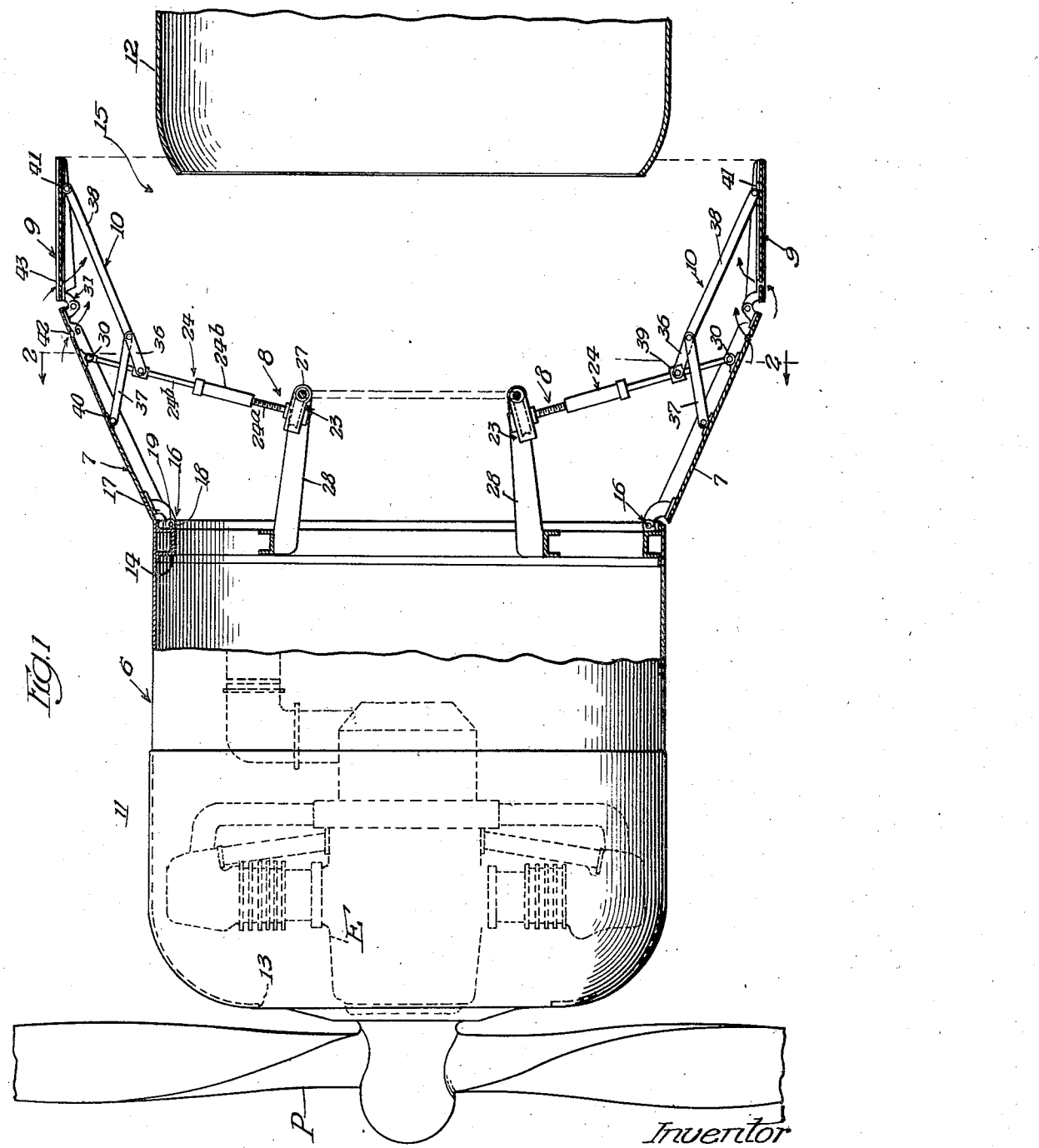

The nacelle structure which is shown in the drawings constitutes the preferred form or embodiment of the invention. It is designed for use in connection with a tractor variety airplane (not shown) and serves as an enclosing or housing medium for the propelling engine of the airplane. The airplane engine is designated in Figure 1 of the drawing by the reference letter E and is illustrated as being of the radial cylinder type. It is housed within the front end of the nacelle structure and has the front end of its crank shaft connected to drive a propeller P. In general the nacelle structure comprises a tubular shell 6, an annular series of main cowl flaps 7, power operated mechanism 8 for shifting the main cowl flaps, auxiliary cowl flaps 9, and linkages 10 for controlling the position of the auxiliary cowl flaps.

The shell 6 is suitably connected to the airplane to which the nacelle structure is applied and extends in a fore and aft direction, as well understood in the art. It is sectional in construction or design and consists of a front section 11 and a rear section 12. The front shell section 11 is cylindrical and surrounds the propeller driving engine E. The front end of the front shell section is curved inwards and defines adjacent the root portions of the blades of the propeller P an axial inlet opening 13 for engine cooling air. When the airplane is in operation air enters the front section of the shell via the inlet opening 13 and flows rearwards around the engine E. During rearward flow of the air around the engine the air serves to cool the engine. The rear end of the front section 11 of the shell is reenforced by an interiorly disposed former ring 14. The rear section 12 of the shell 6 is cylindrical and, as shown in Figure 1, is in axial alignment with, and disposed behind, the front section 11. It is substantially the same in diameter as the front section and has the front end thereof curved inward to a slight extent. The front end of the rear shell section and the rear end of the front shell section define an annular outlet opening 15 whereby the engine cooling air may be discharged to the surrounding atmosphere after flow thereof past the engine E.

The main cowl flaps 7 extend around the outlet opening 15 and together with the auxiliary cowl flaps 9 serve to control the outflow of engine cooling air through the outlet opening. They are arcuate in cross section and have hinge connections 16 at their front corners in order that they are capable of being swung back and forth between a closed position wherein they extend across and serve partially to close the annular outlet opening 15 and an open position wherein they extend outwards away from the outlet opening and thus expose the latter so as to permit engine cooling air to be exhausted to surrounding atmosphere. The hinge connections 16 comprise inwardly and forwardly extending brackets 17 on the front corners of the main cowl flaps 7, rearwardly extending brackets 18 on the former ring 14 within the rear end of the front shell section 11, and pivot pins 19. The pivot pins extend through the brackets 17 and 18 and constitute the articulation points about which the main cowl flaps swing. Certain of the side margins of the main cowl flaps 7 are provided with inset triangular extensions 7a and these underlie and engage slidably the other side margins of the main cowl flaps and serve to close the wedge shaped spaces between the main cowl flaps when the latter are in their open position.

Figure 2:
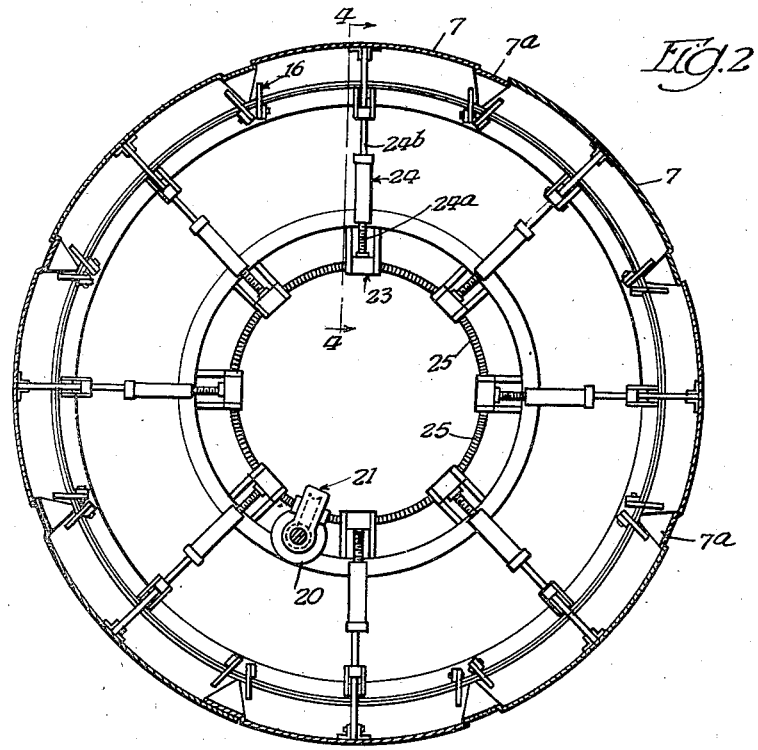

The power operated mechanism 8 serves conjointly to swing the main cowl flaps 7 back and forth between their open and closed positions. It is disposed within the central portion of the shell 6 of the nacelle structure and comprises an electric motor 20, a speed reducing unit 21, an annular series of flexible shafts 22, worm and worm gear driving connections 23 and screw jacks 24. The electric motor 20 is suitably supported within the shell 6. It is of the reversible type and receives current from an electrical source (not shown) under control of switch mechanism (also not shown) in the pilot's compartment of the airplane to which the nacelle structure is applied. The speed reducing unit 21 is associated with the reversible electric motor 20 and embodies certain gearing which is connected for drive by the armature shaft of the motor. The gearing includes a transversely extending driven shaft and is mounted in a casing which is joined to the casing of the motor 20. The flexible shafts 22 are rotatably mounted in arcuate tubes 25 and serve operatively to connect the worm and worm gear connections 23 for drive by the driven shaft of the speed reducing unit 21. As shown in Figure 2 of the drawings the tubes 25 are arranged in an annular or circular series in the space between the rear end of the front shell section 11 and the front end of the rear shell section 12. The worm and worm gear connections 23 correspond in number to the main cowl flaps 7 and are disposed between the ends of the tubes 25. They are housed within gear boxes 26 and comprise worms 23a and worm gears 23b. The worms 23a extend at right angles to the axis of the shell 6 and are provided at the ends thereof with pintles which are journaled in, and extend through the gear boxes 26 and have the outer ends thereof journalled in bearings 27 and drivably connected to the ends of the flexible shafts 22. The bearings 27 are suitably supported by way of brackets 28 in the shell 6 of the nacelle structure and permit the gear boxes 26 together with the worm and worm gear driving connections 23 to tilt or rock laterally. The screw jacks 24 correspond in number to the worm and worm gear driving connections 23 and extend between the gear boxes 26 and the main cowl flaps 7. They operate in response to drive of the worm and worm gear connections to swing the main cowl flaps inwards or outwards, depending upon the direction of drive of the worm and worm gear driving connections and consist of screw shafts 24a and sleeve equipped shaft 24b. As shown in the drawings the screw jacks 24 extend radially outwards from the gear boxes 26. The inner ends of the screw shafts 24a extend through holes 29 in the gear boxes 26 and are fixedly connected to the central portions of the worm gears 23b of the worm and worm gear driving connections 23. When such connections are driven in one direction in response to drive of the electric motor 20 in one direction they cause conjoint rotation of the screw shafts 24a in one direction. Reverse drive of the worm and worm gear connections 23 results in reverse rotation of the screw shafts 24a of the screw jacks 24. The sleeve equipped shafts 24b of the screw jacks embody at the inner ends thereof internally threaded sleeves and these surround and are in screw threaded engagement with the outer ends of the screw shafts 24a. The outer ends of the sleeve equipped shafts 24b are connected by universal joints 30 to the central rear portions of the main cowl flaps 7. When the screw shafts 24a are rotated in one direction they cause the sleeve equipped shafts 24b to move axially outwards and effect opening of the main cowl flaps 7. Reverse rotation of the screw shafts 24a results in inward feed of the sleeve equipped shafts 24b and resultant closing of the main cowl flaps 7.

Figure 3:
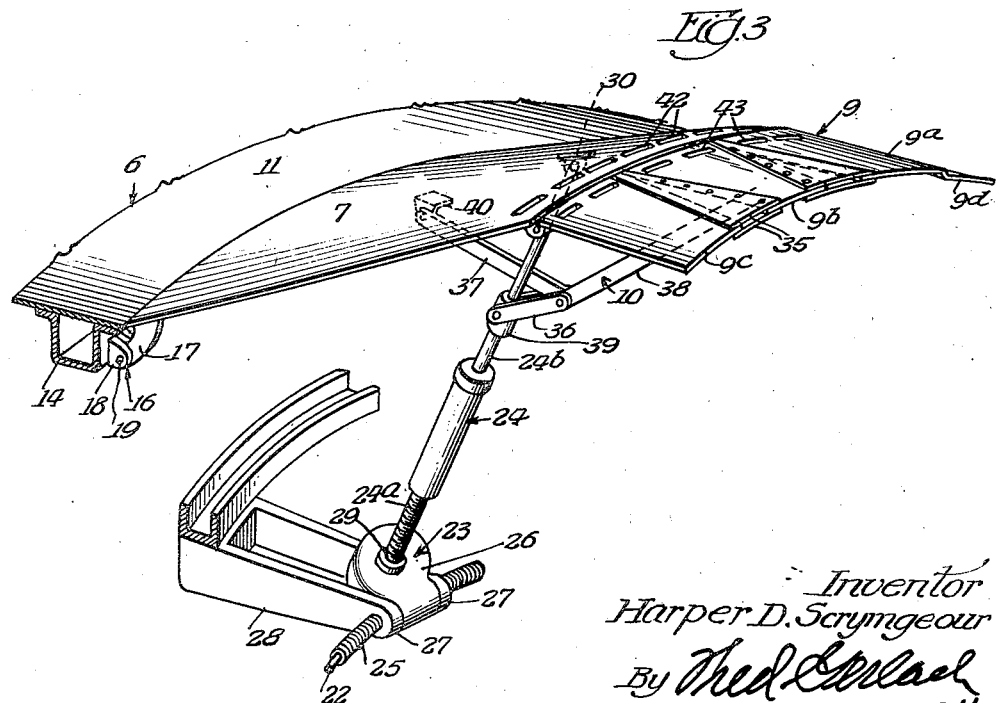
Figure 3 is a perspective of one of the main cowl flaps together with its auxiliary cowl flap.

The auxiliary cowl flaps 9 correspond in number to, and are associated, respectively, with, the main cowl flaps 7 and are located adjacent the trailing edges of the main cowl flaps. They serve with the main cowl flaps to close the annular outlet opening 15 when the main cowl flaps are in their closed position and, as hereinafter described, are controlled by the linkages 10 so that they are positioned at all times in substantially parallel relation with the axis of the shell 6 regardless of the position of the main cowl flaps. As a result of the fact that the auxiliary cowl flaps 9 are always maintained in substantially parallel relation with the axis of the shell regardless of the position of the main cowl flaps they serve or operate when the main flaps are in their open position so to control the flow of air emanating from the annular outlet opening 15 that the tendency of such air to produce turbulence and eddy currents when it joins the propeller created slip stream is reduced to a minimum. They also serve when the main cowl flaps 7 are in their open position to facilitate the exhaust of the engine cooling air through the annular outlet opening 15 and thus so increase the flow of air through the front section of the shell that extremely effective and efficient cooling of the engine E is obtained. Preferably the auxiliary cowl flaps 9 are of sectional design or construction and each consists of three side by side sections 9ª, 9ᵇ and 9ᶜ. The sections 9ᵇ are disposed between the sections 9ª and 9ᶜ, as shown in Figure 3. The sections are of such arcuate cross section and are so arranged that they serve to close the rear portion of the annular outlet opening 15 when the auxiliary flaps are in their closed position. The front corners of the sections 9ª, 9ᵇ and 9ᶜ are connected to the trailing marginal portions of the main cowl flaps 7 by hinge connections 31 in order that the auxiliary cowl flaps are capable of swinging relatively to the main cowl flaps. The hinge connections 31 comprise inwardly and forwardly extending hinge brackets 32 on the front or leading portions of the sections 9ª, 9ᵇ and 9ᶜ, inwardly and rearwardly extending hinge brackets 33 on the trailing marginal portions of the main cowl flaps 7, and pivot pins 34. The latter extend through aligned holes in the brackets 32 and 33 and constitute the articulation points for the sections constituting the auxiliary cowl flaps 9. The intermediate sections 9ᵇ of the auxiliary cowl flaps have along the side margins thereof fixedly connected upper and lower triangular plates 35 and these are arranged in straddled relation and sliding engagement with the inner side margins of the outer sections 9ª and 9ᶜ and have a twofold purpose in that they serve to connect the sections 9ª, 9ᵇ and 9ᶜ for conjoint swinging movement and close or seal the spaces between the sections 9ᵇ and the sections 9ª and 9ᶜ when the auxiliary flaps are in their open position. The outer side margins of the sections 9ª are provided with instruck triangular extensions 9ᵈ and these are in slidable engagement with the outer side margins of the sections 9ᶜ and serve to close the wedge shaped spaces between the auxiliary cowl flaps 9 when such flaps are in their open position due to the main cowl flaps 7 being in their open position.

The linkages 10 correspond in number to, and are associated, respectively, with the auxiliary cowl flaps 9 and operate, as hereinbefore pointed out, so to control the auxiliary cowl flaps 9 that they are maintained in substantially parallel relation with the axis of the shell regardless of the position of the main cowl flaps. They are operatively connected to the screw jacks 24 and the main cowl flaps 7 and comprise links 36, links 37 and links 38. The links 36 are disposed inwards of the rear or trailing portions of the main cowl flaps 7 and extend in a general rearward direction from the screw jacks 24. The front ends of the links 36 are pivotally connected to fixed collars 39 on the central portions of the sleeve equipped shafts 24ᵇ in order that the links 36 are capable of swinging inwards and outwards. The links 37 are disposed outwards of the links 36 and are positioned in a fore and aft direction with respect to the shell 6 of the nacelle structure. The front ends of the links 37 are pivotally connected to inwardly extending brackets 40 on the central portions of the main cowl flaps 7 and the rear ends of the links 37 are pivotally connected to the distal or rear ends of the links 36. The links 38 are disposed rearward of the links 36 and extend generally in a fore and aft direction with respect to the shell 6. The front ends of the links 38 are pivotally connected to the rear ends of the links 36 and 37 and the rear ends of the links 38 are pivotally connected to inwardly extending brackets 41 on the rear portions of the intermediate sections 9ᵇ of the auxiliary cowl flaps 9. The arrangement of the links 36, 37 and 38 is such that the linkages 10 in connection with outward and inward swinging of the main cowl flaps 7 cause the auxiliary flaps 9 to swing angularly relatively to the main cowl flaps while at the same time maintaining them in substantially parallel relation with the axis of the shell 6. When the main cowl flaps are swung outwards by the screw jacks into their open position the linkages 10 cause the auxiliary cowl flaps to swing inwards relatively to the main cowl flaps and when the main cowl flaps are swung inwards by the screw jacks into their closed position the linkages 10 cause the auxiliary cowl flaps to swing outwards with respect to the main cowl flaps. The design of the linkages is such that when the main cowl flaps are in their closed position the auxiliary cowl flaps 9 assume a closed position wherein they are aligned with the main cowl flaps and have the rear ends thereof either in lapped relation with the front end of the rear section 12 of the shell or in spaced relation, depending upon the position of the rear shell section 12 with respect to the front section 11. When the auxiliary cowl flaps 9 are in their open position, as shown in full lines in Figures 1 and 4, they direct the engine cooling air emanating from the annular outlet opening 15 rearwards and hence prevent such air from so uniting with the propeller created slip stream as to produce turbulence and eddy currents tending to cause pronounced flutter and vibration of the various control surfaces on the empennage of the airplane to which the nacelle structure is applied. As a result of the manner in which the auxiliary cowl flaps are automatically controlled such flaps, when in their open position, have such a directional effect on the propeller created slip stream that the latter by a pronounced aspiring effect induces exhaust of the engine cooling air through the annular outlet opening 15 and thus stimulates flow of the cooling air past the engine E.

When it is desired to swing the main and auxiliary cowl flaps inwards into their closed positions the electric motor 20 is driven so as to cause the screw shafts 24ª to revolve or rotate in such direction as to effect inward feeding of the sleeve equipped shafts 24ᵇ. When it is desired to shift the main and auxiliary cowl flaps outwards into their open position the electric motor 20 is reversely driven. By controlling operation of the motor the main cowl flaps may be swung into any desired angular position. Regardless of the angular position of the main cowl flaps the linkages 10 at all times maintain the auxiliary cowl flaps in substantially parallel relation with the axis of the shell 6 as hereinbefore pointed out.

In order to improve the aerodynamic characteristics of the flap structure the trailing margins of the main cowl flaps 7 are provided with slots 42 and the leading margins of the auxiliary cowl flaps 9 are provided with slots 43. As shown in the drawings, the slots are in series form and extend transversely of the flaps. Said slots 42 and 43 are so designed and arranged that they improve the laminar flow characteristics of the flaps by destroying the exterior and interior boundary layer friction that exists in the hinge joint between the main cowl flaps 7 and the auxiliary cowl flaps 9. The prime purpose of the slots 42 and 43 is so to improve the aerodynamic action of the flaps as to facilitate their actuation and release the load upon the actuating mechanism.

The herein described nacelle structure is highly efficient so far as cooling of the propeller driving engine is concerned and this is directly attributable to the fact that it includes the auxiliary cowl flaps 9 together with the controlling linkages 10 for such flaps.

The invention is not to be understood as restricted to the details set forth since these may be modified within the scope of the appended claims without departing from the spirit and scope of the invention.

Having thus described the invention what I claim as new and desire to secure by Letters Patent is:

1. An airplane nacelle structure adapted to house an engine for the airplane and comprising an elongated shell positioned lengthwise of the airplane, having the front end thereof extending around the engine and provided with an inlet opening for engine cooling air, and embodying rearwards of the engine an outlet opening for the engine cooling air, a series of main cowl flaps associated with, and adapted to control the flow of air through the outlet opening and having the leading portions thereof hinged so as to be capable of swinging inwards and outwards between open and closed positions, a series of auxiliary cowl flaps projecting rearwardly from, and hinged to the trailing portions of, the main cowl flaps, and means for maintaining said auxiliary cowl flaps at substantially a constant angle with respect to the longitudinal axis of the shell regardless of the position of the main cowl flaps.

2. An airplane nacelle structure adapted to house a propelling engine for the airplane and comprising an elongated shell positioned lengthwise of the airplane, having the front end thereof extending around the engine and provided with an inlet opening for engine cooling air, and embodying rearwards of the engine an outlet opening for the engine cooling air, a series of main cowl flaps associated with, and adapted to control the flow of air through, the outlet opening, and having the leading portions thereof hinged so as to be capable of swinging inwards and outwards between open and closed positions, a series of auxiliary cowl flaps movably connected to the trailing portions of the main cowl flaps, and means for maintaining the auxiliary cowl flaps at a predetermined angle with respect to the longitudinal axis of the shell regardless of the position of the main cowl flaps.

3. An airplane nacelle structure adapted to house a propelling engine for the airplane and comprising a tubular shell positioned lengthwise of the airplane, having the front end thereof extending around the engine and provided with an inlet opening for engine cooling air, and embodying rearwards of the engine an outlet opening for the engine cooling air, a series of main cowl flaps associated with, and adapted to control the flow of air through, the outlet opening, and having the leading portions thereof hinged so as to be capable of swinging inwards and outwards between open and closed positions, a series of auxiliary cowl flaps hinged to the trailing portions of the main cowl flaps, and means for maintaining the auxiliary cowl flaps in substantially parallel relation with the longitudinal axis of the shell regardless of the position of the main cowl flaps.

4. An airplane nacelle structure adapted to house a propelling engine for the airplane and comprising a substantially cylindrical shell positioned lengthwise of the airplane, having the front end thereof extending around the engine and provided with an axial inlet opening for engine cooling air, and embodying rearwards of the engine an annular outlet opening for the engine cooling air, an annular series of main cowl flaps associated with, and adapted to control flow of air through, the outlet opening, and having the leading portions thereof hinged so as to be capable of swinging inwards and outwards between open and closed positions, an annular series of auxiliary cowl flaps corresponding in number to, and hinged to the trailing portions of, the main cowl flaps, and means for maintaining the auxiliary cowl flaps in substantially parallel relation with the longitudinal axis of the shell regardless of the position of the main cowl flaps.

5. An airplane nacelle structure adapted to house a propelling engine for the airplane and comprising a tubular shell positioned lengthwise of the airplane, having the front end thereof extending around the engine and provided with an inlet opening for engine cooling air, and embodying rearwards of the engine an outlet opening for the engine cooling air, a series of main cowl flaps associated with, and adapted to control the flow of air through, the outlet opening in the shell and having the leading portions thereof hinged so as to be capable of swinging inwards and outwards between open and closed positions, power operated means within the shell for conjointly swinging the main cowl flaps, a series of auxiliary cowl flaps hinged to the trailing portions of the main cowl flaps, and linkages operatively connected to the auxiliary cowl flaps, the main cowl flaps and the power operated mechanism and arranged to maintain the auxiliary cowl flaps in substantially parallel relation with the longitudinal axis of the shell regardless of the angular position of the main cowl flaps.

6. An airplane nacelle structure adapted to house an engine for the airplane and comprising an elongated shell positioned lengthwise of the airplane, having the front end thereof extending around the engine and provided with an inlet opening for engine cooling air, and embodying rearwards of the engine an outlet opening for the engine cooling air, a series of main cowl flaps associated with, and adapted to control the flow of air through, the outlet opening and having the leading portions thereof hinged so as to be capable of swinging inwards and outwards between open and closed positions, a series of auxiliary cowl flaps corresponding in number to, and associated respectively with, the main cowl flaps, hinged to the trailing portions of said main cowl flaps and each consisting of a plurality of side by side sections with means between the sections for connecting them together for conjoint swinging movement, and means for maintaining said auxiliary cowl flaps at a predetermined angle with respect to the longitudinal axis of the shell regardless of the position of the main cowl flaps.

HARPER D. SCRYMGEOUR.

REFERENCES CITED

The following references are of record in the file of this patent:

UNITED STATES PATENTS

| Number | Name | Date |
|---|---|---|
| 2,248,150 | Wilson et al. | July 8, 1941 |
| 1,757,783 | Schlesinger | May 6, 1930 |
| 2,168,599 | Beisel et al. | Aug. 8, 1939 |
| 2,098,947 | Fedden et al. | Nov. 16, 1937 |

FOREIGN PATENTS

| Number | Country | Date |
|---|---|---|
| 704,745 | Germany | Apr. 5, 1941 |
| 502,732 | England | Mar. 20, 1939 |
| 456,335 | England | Nov. 3, 1936 |